(12) United States Patent
Schreiber

(10) Patent No.: US 8,597,436 B2
(45) Date of Patent: *Dec. 3, 2013

(54) AQUA COMB HAIR GROOMING DEVICE AND METHOD

(76) Inventor: Mark Allen Schreiber, Sarasota, FL (US)

( * ) Notice: Subject to any disclaimer, the term of this patent is extended or adjusted under 35 U.S.C. 154(b) by 845 days.

This patent is subject to a terminal disclaimer.

(21) Appl. No.: 12/800,977

(22) Filed: May 21, 2010

(65) Prior Publication Data

US 2011/0232664 A1   Sep. 29, 2011

Related U.S. Application Data

(63) Continuation-in-part of application No. 12/798,013, filed on Mar. 29, 2010.

(51) Int. Cl.
*B08B 3/00* (2006.01)
*B08B 3/12* (2006.01)
*B08B 6/00* (2006.01)

(52) U.S. Cl.
USPC ........ 134/166 R; 134/34; 134/43; 134/167 R; 134/172; 134/178; 134/180; 134/182; 134/183; 134/198; 134/199

(58) Field of Classification Search
USPC ...... 134/34, 43, 166 R, 167 R, 172, 178, 180, 134/182, 183, 198, 199
See application file for complete search history.

(56) References Cited

U.S. PATENT DOCUMENTS

| | | | | |
|---|---|---|---|---|
| D331,840 S | * | 12/1992 | Garner | D4/114 |
| 5,649,502 A | * | 7/1997 | Frank | 119/665 |
| 5,725,130 A | * | 3/1998 | Kluge et al. | 222/192 |
| 6,302,607 B1 | * | 10/2001 | Burrowes et al. | 401/18 |
| 6,718,913 B1 | * | 4/2004 | Stupar | 119/602 |
| 6,827,039 B1 | * | 12/2004 | Nelson | 119/604 |
| 2002/0011259 A1 | * | 1/2002 | Pociask | 134/34 |
| 2006/0153625 A1 | * | 7/2006 | Embry | 401/24 |
| 2008/0028556 A1 | * | 2/2008 | Papenfuss | 15/142 |
| 2009/0056753 A1 | * | 3/2009 | Heathcote et al. | 134/16 |

\* cited by examiner

*Primary Examiner* — Michael Barr
*Assistant Examiner* — Charles W Kling
(74) *Attorney, Agent, or Firm* — Dorothy S. Morse

(57) ABSTRACT

An aqua comb used with a hose for thoroughly and quickly cleaning, rinsing and combing the hair of both humans and animals. The aqua comb comprises four design elements: 1) a rotating hose nut with internal seal that is employed to attach the aqua comb to various hose endings, 2) an on/off valve for controlling fluid flow through the aqua comb, 3) an elongated and rigid fluid spray body with fluid discharge openings, and 4) a semi-rigid comb member positioned above the discharge openings to lift hair and allow fluid spray to reach scalp and skin thereunder. The core design element of the aqua comb is the presentation angle and comb member structure which work in concert with the fluid spray discharged from the fluid spray openings in its elongated spray body to multiply and leverage mechanical cleaning and combing action.

20 Claims, 3 Drawing Sheets

AQUA COMB HAIR GROOMING DEVICE AND METHOD

CROSS-REFERENCES TO RELATED APPLICATIONS

The U.S. utility patent application herein (Ser. No. 12/800, 977, with a Filing Date of May 21, 2010) is a continuation-in-part of a previous U.S. utility patent application filed by the same inventor herein and entitled 'Aqua Comb', which has a Filing Date of Mar. 29, 2010 and was given the Ser. No. 12/798,013. Since the earlier-filed utility patent application Ser. No. 12/798,013 was still pending on the filing date of the applicant's U.S. utility patent application Ser. No. 12/800, 977, and both applications had (and still have) co-pending status, the applicant herein respectfully requests that domestic priority be given to this continuation-in-part U.S. patent application Ser. No. 12/800,977 based upon his earlier-filed U.S. patent application Ser. No. 12/798,013.

BACKGROUND

1. Field of the Invention

This invention relates to apparatus for grooming and cleaning both human and animal hair, particularly to an aqua comb having a wide flat spray pattern combined with a wide and long-fingered comb member that allows a person to thoroughly and quickly clean and untangle either human or animal hair. Additionally the gentle spray and flexible comb fingers of the aqua comb have a soothing and massage-like effect that calms the animal while grooming occurs. This minimizes the need for animal restraints during grooming.

2. Description of the Related Art

Although water spray from a hose and devices such as combs may be used separately or together to clean and rinse human and animal hair, these devices are not fast, effective, or easy to use, and particularly when grooming animals, such as a dog or horse but not limited thereto, the removal of insects, dander, dirt, mud, loose hair, and other debris close to or in contact with the skin can be a challenge. In contrast, the wide, flat pattern of the fluid spray created by the present invention aqua comb, in combination with its long and semi-rigid comb fingers that are angled to lift hair and allow fluid spray thereunder to reach the skin, is able to better clean and untangle human and animal hair, and accomplish a thorough cleaning with a massage-like effect that calms an animal and minimizes the need for restraints during the grooming process.

BRIEF SUMMARY OF THE INVENTION

The primary objective of the present invention aqua comb is to provide fast, easy, and thorough cleaning and untangling of human and animal hair. It has a connector nut that allows connection to various water hose endings. It also has an on/off switch that may be either a ball, barrel, butterfly, or gate valve type. The fluid spray holes in its elongated spray body may in the alternative be round of various diameters, slits of various lengths and widths, or the combination of slit and holes. Fluid spray discharged from the fluid spray holes is a wide, flat spray pattern, and not a narrow stream. The comb member may be various widths, lengths and shapes to better conform to the variations in size and shape of humans and animals who could benefit from use of the present invention aqua comb. Use of the present invention for grooming purposes can be best accomplished when it is oriented so that the fluid spray is adjacent to the skin and the long fingers of the comb member lift the hair upwardly away from the skin, as shown in FIGS. 4 and 5.

These and other features, aspects and advantages of the present invention will become better understood with reference to the following drawings, description and claims.

BRIEF DESCRIPTION OF THE DRAWINGS

FIG. 2 illustrates a side elevation view of the most preferred embodiment of the aqua comb invention, further showing a preferred presentation angle of the comb member relative to the valve and connector nut, as well as the preferred means of connecting the comb member to the spray body, while

DETAILED DESCRIPTION OF PREFERRED EMBODIMENTS

The following detailed description represents the best and other currently contemplated modes for carrying out the invention. The description is not to be taken in a limiting sense, but is made merely for the purpose of illustrating the general principles of the invention.

Figure 1:
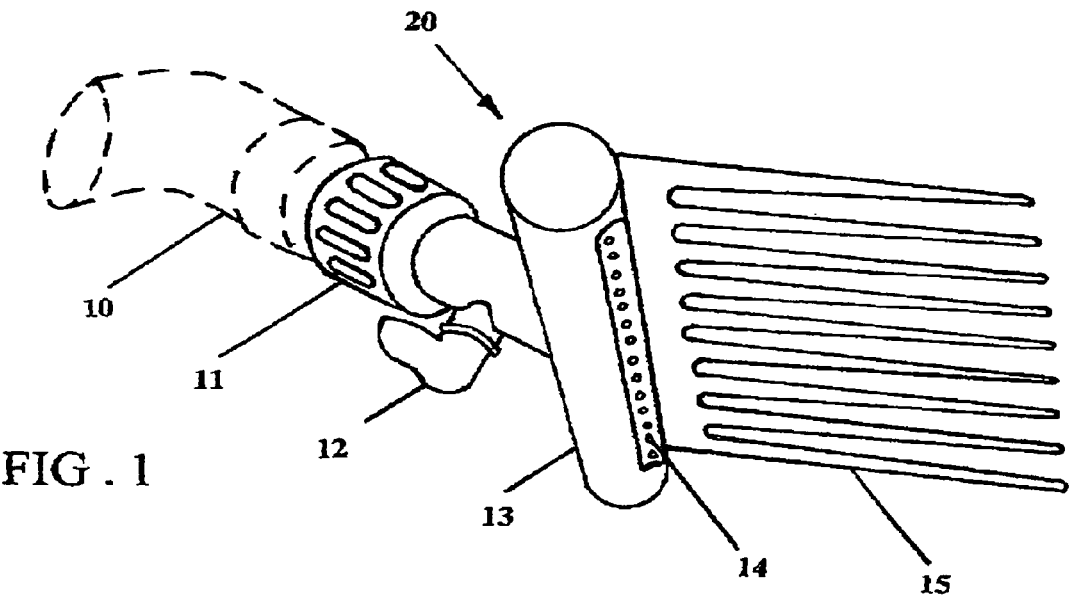
FIG. 1 illustrates a perspective elevation view of the most preferred embodiment of the aqua comb invention showing an elongated spray body with multiple spaced-apart fluid openings therethrough in longitudinal orientation; a comb member attached to the spray body at a presentation angle above the fluid openings and having a plurality of long comb fingers positioned to lift the hair being groomed upwardly away from the adjacent skin while fluid spray discharged from the fluid openings dislodges dirt and debris from the skin and the portion of the hair close to the skin, an on-off valve, and a nut configured for connecting it to a hose.
Figure 2:
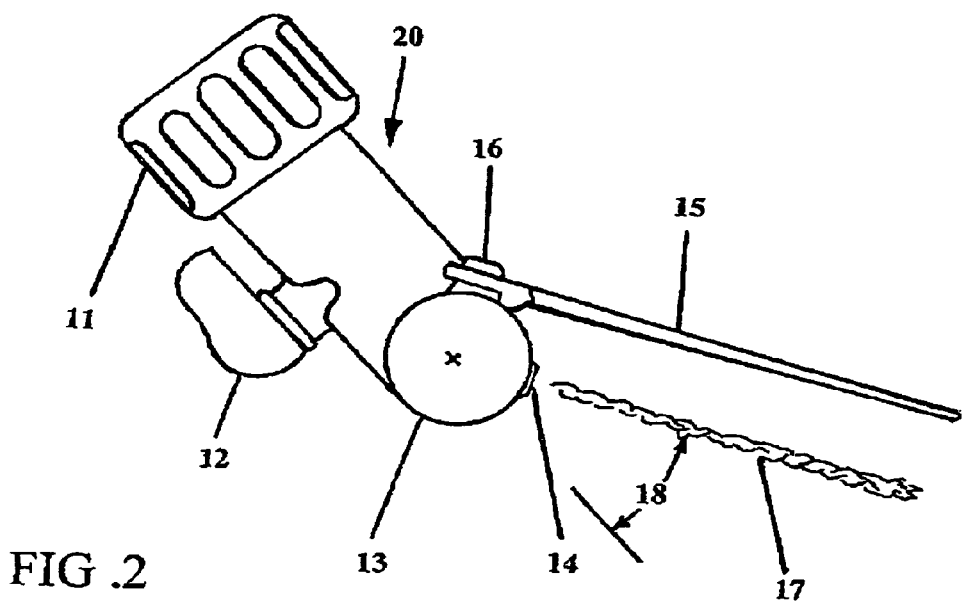

Referring to FIGS. 1-5 the most preferred embodiment of the aqua comb invention 20 can be connected to a hose 10 and held by person's hand (not numbered) in a position close to the skin 23 supporting human hair 21 or animal hair 24, with its comb member fingers 15 positioned above the fluid spray 17 discharged from fluid openings 14 in spray body 13. As seen in FIGS. 1 and 2, the comb member of the most preferred embodiment of invention 20 has a planar configuration and multiple fingers 15 with a detachable connection via fastener 16 to spray body 13. When the long and semi-rigid comb member fingers 15 of aqua comb 20 become interfaced with human hair 21 or animal hair 24, and water flows from hose 10 through connector nut 11, through on-off valve 12, and is then discharged from the fluid openings 14 in elongated spray body 13 under the long and semi-rigid comb member fingers 15 positioned above fluid spray openings 14, the water/spray 17 then travels fully to the base of human hair 21 or animal hair 24 and the skin 23 supporting it wherein the combination of comb fingers 15 and the water/spray 17 dislodges soaps, colorants, insects, dirt, mud, dander, and debris (not shown) located near the base of human hair 21 or animal hair 24 and on the skin 23 supporting human hair 21 or animal hair 24. The aqua comb 20 may have a spray body 13 made of metal, plastic or like rigid material. The spray body 13 may have a width to match the width of the comb member 15. For example, if the comb member 15 is three inches wide, then the spray body 13 may be three-and-three-fourths inches wide. Depending on the size of person 21 or animal 22, the widths of comb member 15 and spray body 13 may be adjusted to allow better mechanical interfacing.

The spray body 13 may have different sizes of hose nut 11 with seal for attaching the aqua comb 20 to various size water hoses 10. The spray body 13 may have an in-line on/off valve 12 which may be either a ball, barrel, butterfly, or gate valve type.

Figure 2A:
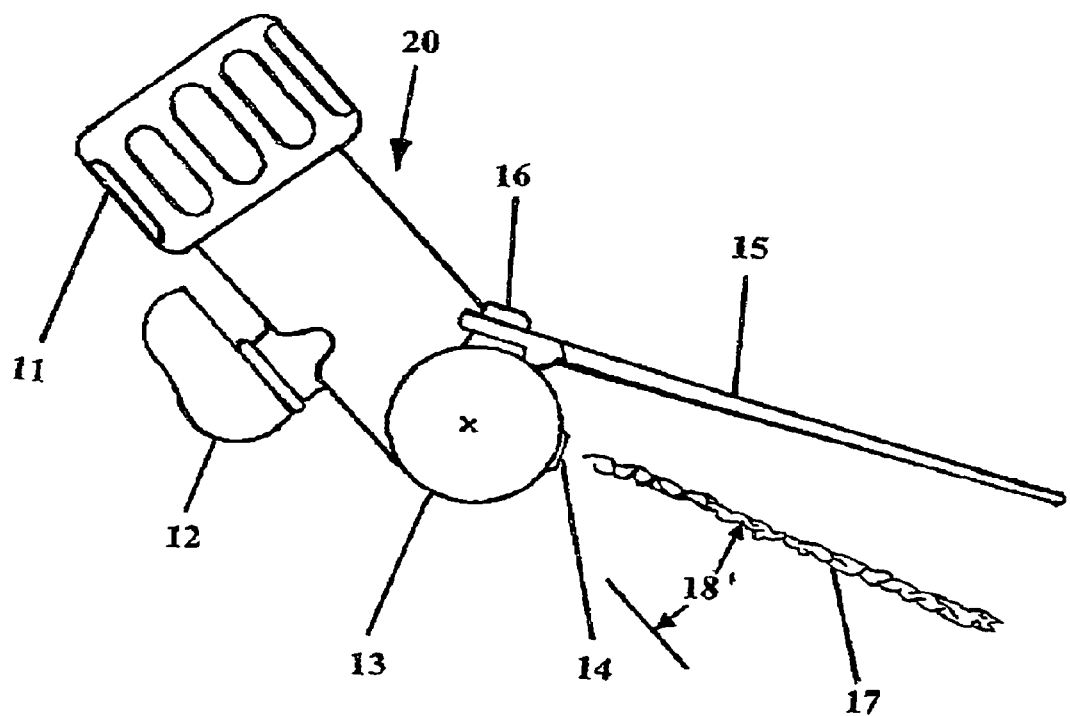
FIG. 2A shows a presentation angle wherein fluid spray is angled away from the comb member.
Figure 3:
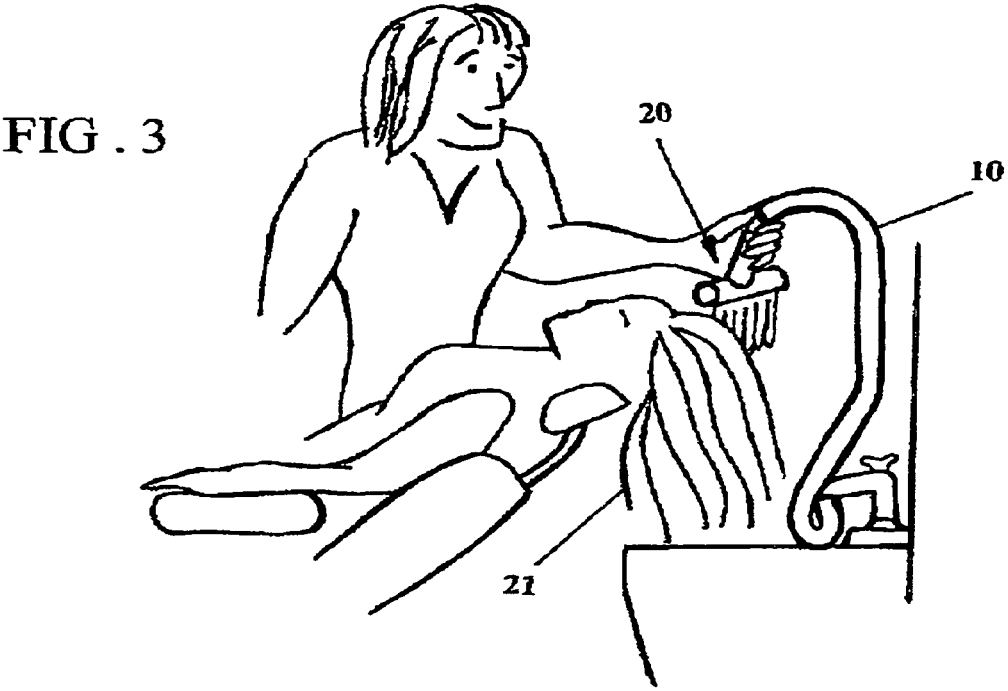
FIG. 3 illustrates a perspective elevation view of the most preferred embodiment of the aqua comb invention interfaced with the target human hair in need of grooming.
Figure 4:
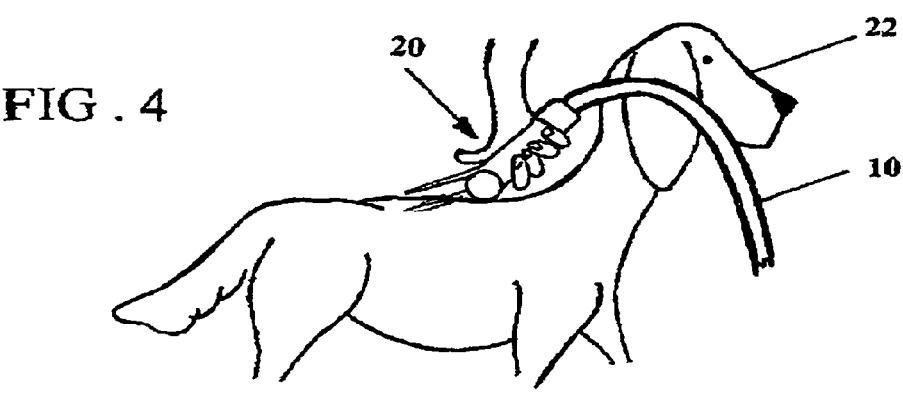
FIG. 4 illustrates a perspective elevation view of the most preferred embodiment of the aqua comb invention interfaced with the target animal hair in need of grooming.
Figure 5:
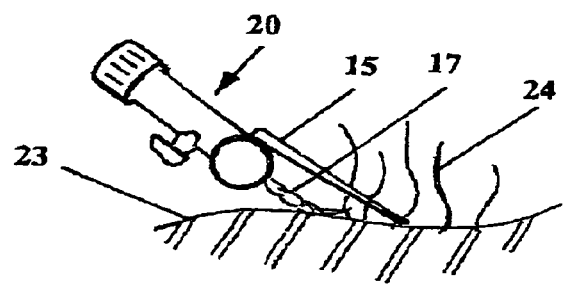
FIG. 5 illustrates a side elevation view of the most preferred embodiment of the aqua comb invention showing a proper orientation thereof relative to target skin and hair that allows the comb fingers to lift hair while fluid spray under the comb fingers dislodges dirt and debris accumulated on the base of the hair and skin or scalp near the base of the hair.

The fluid spray holes 14 in elongated spray body 13 may be round of various diameters, slits of various lengths and widths, or the combination of slits and holes. The fluid spray 17 is configured as a wide and flat fluid spray flushing pattern directed away from on/off valve 12 and hose nut 11, and may be parallel to, or angled away from comb member 15, as respectively shown in FIGS. 2 and 2A. The presentation angle 18 of fluid spray 17 may also be adjusted (see presentation angle 18' in FIG. 2A).

The comb member 15 may be attached to the spray body 13 with fasteners 16, clips, snaps and or adhesives. As seen from the top and side respectively in FIGS. 1 and 2, comb member fingers 15 are spaced-apart from one another and each have a distally-narrowing configuration. The comb member 15 may be made of metal, plastic or like semi-rigid material. The comb member fingers 15 may be longer or shorter than shown in FIGS. 1-5, as well as different widths, spacing, and quantities than shown in FIGS. 1-3, adjusted to allow better mechanical interfacing with the both the skin 23 and the hair 24 of an animal (see FIG. 5).

The aqua comb 20 is designed to mechanically dislodge and physically rinse soaps, colorants, loose debris, deeply imbedded debris, dirt, mud, dead hair, etc found on the skin 23 and in the hair 24 of an animal being groomed. The comb member 15 is further designed to aid in untangling the hair 24 being groomed. The action of the fluid spray 17 and the comb member fingers 15 combine to create a soothing massage action which has a dramatic calming effect that allows animals to be groomed with less need to restrain them; more control with less restraint; and it also frees one of the groomer's hands to aid in this effort.

While the invention has been particularly shown and described with respect to the illustrated embodiments thereof, it will be understood by those skilled in the art that the foregoing and other changes in form and details may be made therein without departing from the spirit and scope of the invention. Thus, instead of being limited to the examples identified in the specification hereinabove, the definition of the invention herein should be determined by the appended claims.

I claim:

1. An apparatus for use with a hose to groom, clean, rinse, and detangle hair on humans and animals, said apparatus comprising:

a hose nut having a longitudinal axis and an internal seal configured for attachment to a hose fitting;

an on/off valve having a longitudinal axis aligned with said longitudinal axis of said hose nut, said on/off valve also in fluid communication with said hose nut and configured to control flow rates of fluid supplied by a hose connected to said hose nut, said on/off valve selected from a group consisting of ball valves, barrel valves, butterfly valves, and gate valves;

a rigid and elongated fluid spray body in fluid communication with said on/off valve and having a plurality of fluid spray openings providing a wide and flat fluid spray flushing pattern directed away from said on/off valve and said hose nut;

a semi-rigid and planar comb member having a plurality of distally-narrowing long fingers, said comb member connected to said fluid spray body in a position placing said long fingers above said fluid spray openings, allowing said wide and flat fluid spray flushing pattern from said fluid spray openings to reach the scalp and skin of an animal while said long fingers lift hair in an upwardly direction away from the scalp and skin providing access through the hair for said wide and flat fluid spray flushing pattern to reach and dislodge debris on the scalp, skin, and the base of hair adjacent to the scalp and skin, and also aid in untangling hair while it is lifted away from the scalp and skin by said long fingers.

2. The apparatus as in claim 1 wherein positioning and orientation of said comb member to said flat fluid flushing spray provides a presentation angle configured to mechanically multiply debris removal and hair untangling while also allowing one-handed manipulation of said apparatus.

3. The apparatus as in claim 1 wherein said fluid spray openings discharge fluid at a non-zero presentation angle relative to said longitudinal axis of said hose nut and said on-off valve.

4. The apparatus as in claim 1 wherein said fluid spray openings are selected from a group consisting of holes and slots.

5. The apparatus as in claim 1 wherein said comb member has a detachable connection to said fluid spray body.

6. The apparatus as in claim 1 wherein said fluid spray body is made from materials selected from a group consisting of metal materials and plastic materials.

7. The apparatus as in claim 1 wherein said fluid spray body has a width dimension similar to that of said comb member.

8. The apparatus as in claim 1 wherein said fluid spray openings discharge fluid at a non-zero presentation angle relative to said longitudinal axis of said hose nut and said on-off valve, and further wherein said presentation angle is adjustable.

9. The apparatus as in claim 1 wherein fluid spray from said fluid spray openings is parallel to said comb member.

10. The apparatus as in claim 1 wherein fluid spray from said fluid spray openings is angled away from said comb member.

11. The apparatus as in claim 1 wherein said comb member is made from materials selected from metal materials and plastic materials.

12. A method for using the apparatus of claim 1 to groom, clean, rinse, and detangle hair on humans and animals, said method comprising the steps of:

providing said apparatus of claim 1 and a fluid delivery hose;

connecting said hose nut and seal of said apparatus to said fluid delivery hose;

holding said apparatus to position said fluid spray openings below said long fingers;

inserting said long fingers into the hair in need of grooming, cleaning, rinsing and detangling; and using said long fingers to lift hair while fluid spray from said fluid spray openings is directed to the scalp, skin, and base of hair adjacent to the scalp and skin to mechanically dislodge debris while flushing dislodged debris away from said scalp, skin, and base of hair adjacent to the scalp and skin.

13. The method of claim 12 further comprising the steps of using said on-off valve to adjust the rate of fluid spray from said fluid spray openings for fast and thorough dislodging and rinsing of soaps, colorants, dirt, mud, and dead hair from the hair on humans and animals.

14. The method of claim 12 further comprising the steps of using said on-off valve to adjust the rate of fluid spray from said fluid spray openings for lubricating, loosening, and mechanically aiding said comb fingers in the act of untangling and grooming hair on humans and animals.

15. The method of claim 12 further comprising the steps of using said on-off valve to adjust the rate of fluid spray from said fluid spray openings to create a soothing massage action which calms animals, giving a groomer more control over the animal, and allowing them to be groomed with less need for restraint.

16. The method as in claim 12 wherein said spray body is made from materials selected from a group consisting of metal materials and plastic materials.

17. The method as in claim 12 wherein said spray body has a width dimension similar to that of said comb member.

18. The method as in claim 12 wherein fluid spray from said fluid spray openings is parallel to said comb member.

19. The method as in claim 12 wherein fluid spray from said fluid spray openings is angled away from said comb member.

20. The method as in claim 12 wherein said comb member is made from materials selected from metal materials and plastic materials.

* * * * *